(12) United States Patent
Sakai

(10) Patent No.: US 7,234,443 B2
(45) Date of Patent: Jun. 26, 2007

(54) THROTTLE VALVE

(75) Inventor: Yuuki Sakai, Kanagawa (JP)

(73) Assignee: Nissan Motor Co. Ltd., Kanagaura (JP)

( * ) Notice: Subject to any disclaimer, the term of this patent is extended or adjusted under 35 U.S.C. 154(b) by 0 days.

(21) Appl. No.: 11/180,222

(22) Filed: Jul. 13, 2005

(65) Prior Publication Data

US 2006/0027209 A1    Feb. 9, 2006

(30) Foreign Application Priority Data

Jul. 14, 2004    (JP)    ............................. 2004-207598

(51) Int. Cl.
*F02D 9/08*    (2006.01)
*F16K 1/22*    (2006.01)

(52) U.S. Cl. ...................... 123/337; 251/305

(58) Field of Classification Search ................ 123/336, 123/337, 403; 251/305–308
See application file for complete search history.

(56) References Cited

U.S. PATENT DOCUMENTS

| | | | |
|---|---|---|---|
| 2,197,555 A * | 4/1940 | Lepicard | ..................... 251/305 |
| 3,960,177 A | 6/1976 | Baumann | |
| 4,491,106 A * | 1/1985 | Morris | ..................... 123/337 |
| 5,465,756 A | 11/1995 | Royalty et al. | |
| 5,979,401 A * | 11/1999 | Hickey | ..................... 123/306 |
| 6,003,490 A * | 12/1999 | Kihara et al. | ..................... 123/337 |
| 6,176,467 B1 * | 1/2001 | Yamashita et al. | ..................... 251/305 |
| 2003/0047703 A1 * | 3/2003 | Patterson | ..................... 123/337 |

FOREIGN PATENT DOCUMENTS

| | | |
|---|---|---|
| DE | 37 20 380 A1 | 6/1987 |
| FR | 2202245 | 5/1974 |
| GB | 1533073 | 11/1978 |

OTHER PUBLICATIONS

European Search Report No. 05254424.4 dated Oct. 25, 2005.

* cited by examiner

*Primary Examiner*—Willis R. Wolfe, Jr.
(74) *Attorney, Agent, or Firm*—Rader, Fishman & Grauer PLLC

(57) ABSTRACT

A valve body or a throttle valve is disclosed that is capable of changing the amount of intake air into an engine according to a gradient angle of a valve body rotatably supported in an intake air passage. The valve body includes at least one first end surface and at least one second end surface formed on an outer circumferential surface thereof. Air eddies occurring from air flow contact with the first and second end surfaces are shifted to each other.

20 Claims, 13 Drawing Sheets

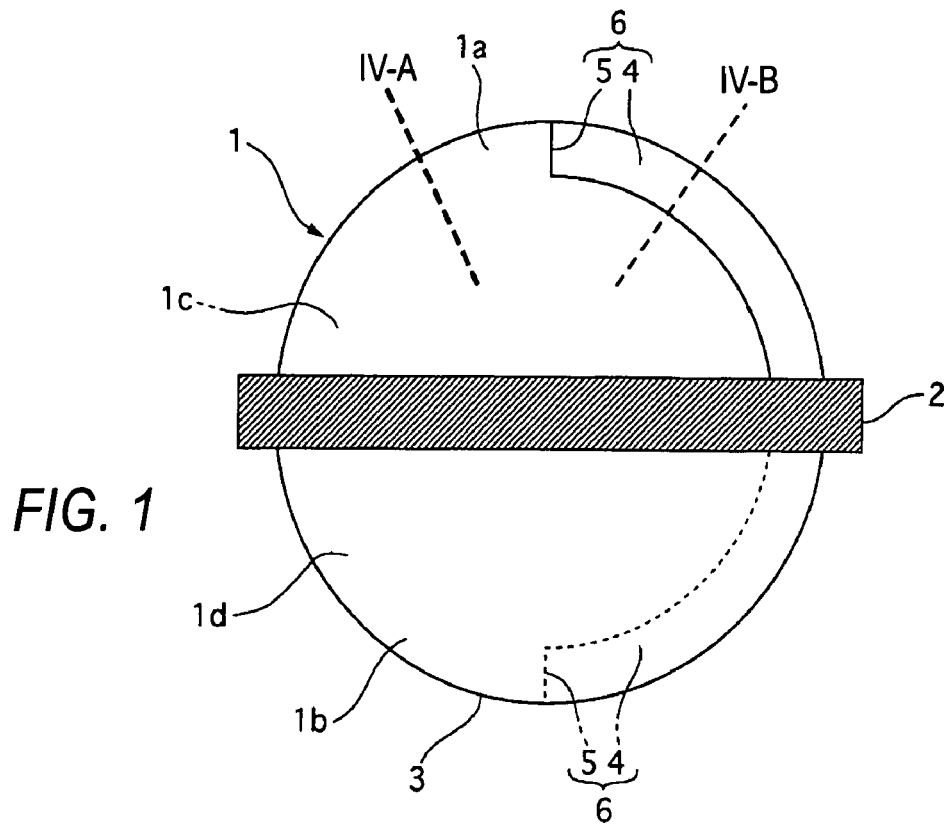
FIG. 1
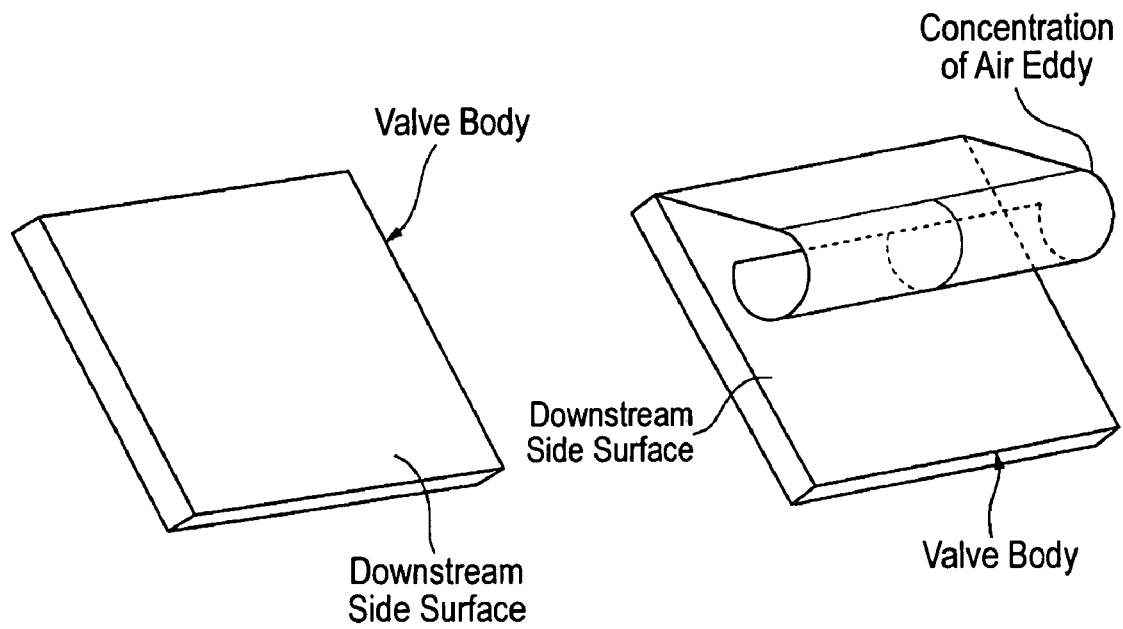
FIG. 2A
(PRIOR ART)
FIG. 2B
(PRIOR ART)

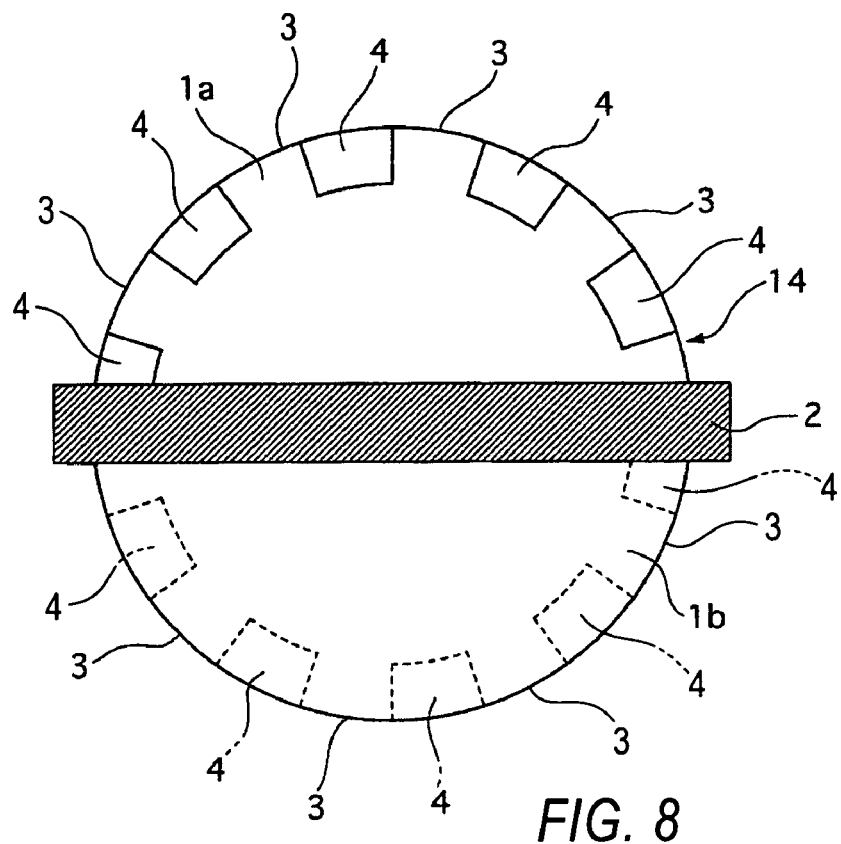
FIG. 8
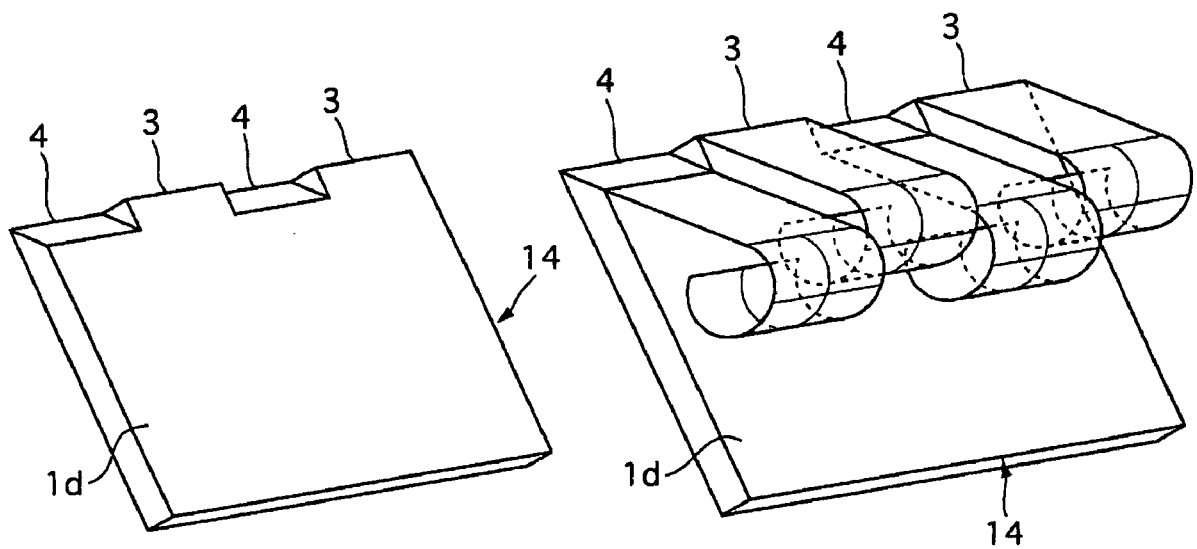
FIG. 9A
FIG. 9B

THROTTLE VALVE

BACKGROUND OF THE INVENTION

1. Field of the Invention

The present invention relates to a throttle valve capable of changing the amount of intake air into an engine.

2. Description of the Related Art

In a conventional throttle valve, as shown in FIG. 23, an air eddy of turbulent airflow which occurs downstream of a valve body is controlled to become small, so that airflow noises are suppressed, by two or more straightening vanes which straighten the intake air on the downstream side surface of the valve body. These straightening vanes are fan-shaped in a cross sectional view and disposed in parallel at an equal interval in a rotational axis extending direction, wherein the vanes are disposed on the valve body so as to be perpendicular to the rotational axis. For a further description of the straightening vanes, refer to, for example, Japanese Laid Open Patent No. 2000-204975.

However, in the above-mentioned conventional technology, these straightening vanes serve as airflow resistance to the intake air, which is a factor of lowering the maximum output of the engine and of worsening the gas mileage.

BRIEF SUMMARY OF THE INVENTION

A throttle valve capable of changing the amount of intake air into an engine by changing an gradient angle of a valve body rotatably supported in an intake air passage is disclosed. At least one first end surface and at least one second end surface are formed on an outer circumferential surface of the valve body, so that air eddies are shifted to each other.

According to at least one embodiment of the present invention, since a position where an air eddy is generated by the intake air which passes through near the first end surface is different from a position where an air eddy is generated by the intake air which passes through near the second end surface, the timing of air eddies occurrences varies. Thus, it is possible to suppress the air eddies of the turbulent airflow generated in the downstream side of the valve body so as to produce relatively small air eddies. Therefore, airflow noises can also be suppressed so as to become small, without increasing the airflow resistance.

Thus, the present invention possesses a number of advantages or purposes, and there is no requirement that every claim directed to that invention be limited to encompass all of them.

In addition, the foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 illustrates the structure of a valve body 1 of a butterfly type throttle valve, which is viewed from an engine side of an intake air passage;

FIGS. 2A and 2B illustrate perspective views showing an outer circumferential end portion of a commonly used prior art valve body;

FIG. 8 illustrates a valve body 14 of the throttle valve according to Embodiment 4 of the present invention;

FIGS. 9A and 9B illustrate an outer circumferential end portion according to Embodiment 4 of the present invention;

FIGS. 12A1, 12A2, 12B, and 12C illustrate sectional views of the valve body 16, taken along lines XII-A1, XII-A2, XII-B, and XII-C shown in FIG. 11 respectively;

DETAILED DESCRIPTION

Figure 3A:
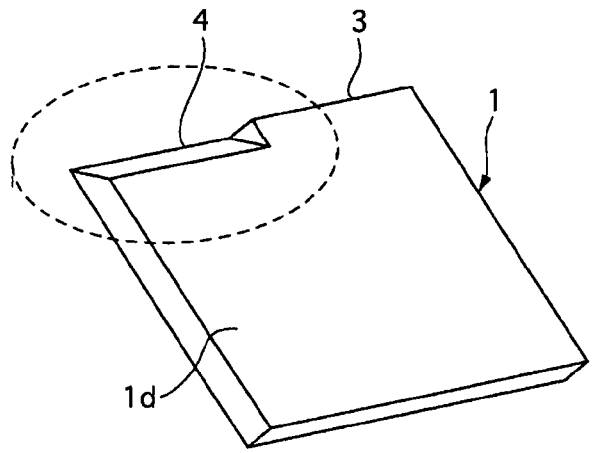
FIGS. 3A and 3B illustrate an outer circumferential end portion according to Embodiment 1 of the present invention.

Description of representative embodiments of the present invention is given, referring to Embodiments 1–16. While the present invention is not necessarily limited to such embodiments, an appreciation of various aspects of the invention is best gained through a discussion of the various examples.

Embodiment 1

First, the structure of a throttle valve according to Embodiment 1 of the present invention will be described below.

FIG. 1 illustrates the structure of a valve body 1 of the throttle valve, which is viewed from an engine side of an intake air passage.

As shown in FIG. 1, the butterfly type valve body 1 is formed in the shape of a disk which corresponds to the shape of the intake air passage (not shown), and has a downstream side (engine side) surface 1d, an upstream side (air cleaner side) surface 1c (which is in back of the downstream side surface in this embodiment), an outer circumferential surface 3 which is formed perpendicular to these two surfaces, and a rotational axis 2. The upstream surface 1c and the down stream surface 1d are generally parallel to each other. The angles formed by the outer circumferential surface 3 and these two surface 1c and 1d, respectively, are not limited to 90 degrees as long as an angle formed by a first end surface (such as the outer circumferential surface 3) and a plane passing through the rotational axis is different from that formed by a second end surface (such as a bottom surface 4 which is described below) and the plane passing through the rotational axis.

The rotational axis 2 rotatably supports the valve body 1 in the intake air passage, and is horizontally disposed at approximately the center of the valve body 1. That is, the amount of intake air into the engine is controlled by tilting (rotating) the valve body 1, changing the rotation angle of the rotational axis 2.

A slot 6 is formed in the outer circumferential surface 3 of the valve body 1. The slot 6 has the bottom surface 4 (tapered portion) formed at a gradient angle $\theta_1$ with respect to the surfaces 1c, and a step surface 5 in contact with the outer circumferential surface 3 of the valve body 1. The step surface 5 is positioned on the right hand side from the middle of the rotational axis of the valve body 1. The gradient angle $\theta_1$ may be described as an angle at which a stream line does not take off at an upstream end portion of the valve. And the gradient angle $\theta_1$ is smaller than an angle formed by the surface 3 and surface 1c.

In an upper portion 1a of the valve body 1 (a portion which is located above the rotational axis 2 in FIG. 1, and is rotated to the upstream side when the valve is open), the slot 6 is formed in the downstream side surface 1d, and also in a lower portion 1b of the valve body 1 (a portion which is located below the rotational axis 2 in FIG. 1 and is rotated to the downstream side when the valve is open), the slot 6 is also formed in the upstream side surface 1c.

Hereinafter, the outer circumferential surface 3 excluding the portion where the slot 6 of the valve body 1 is formed is referred to as a first end surface 3, and the bottom surface 4 is referred to as a second end surface.

An operation of the throttle valve according to the embodiment of the present invention will be described, using a square shaped valve body, in order to simplify the explanation. However, in the present invention, the valve is not limited to a square or round shaped valve but may be a valve having any shape.

FIGS. 2A and 2B illustrate perspective views showing an outer circumferential end portion of a commonly used prior art valve body. Since usually the outer circumferential surface of the valve body is formed uniformly at right angles with respect to an upstream side surface and a downstream side surface, the streamline of the intake air which passes through near the outer circumferential surface of each of the upper and lower portions of the valve body takes off at one position which comprises a line.

Therefore, the air eddy of air turbulence generated in the downstream side of the valve body may become large, and the airflow noises, such as fricatives of air and vibration of the valve body etc, may occur due to the excessive pressure fluctuation accompanying the air turbulence. This phenomenon becomes more remarkable, if the throttle valve is rapidly opened when pressure difference between the upstream side and the downstream side of the valve body is large in a state where the throttle valve is completely closed.

Figure 23:
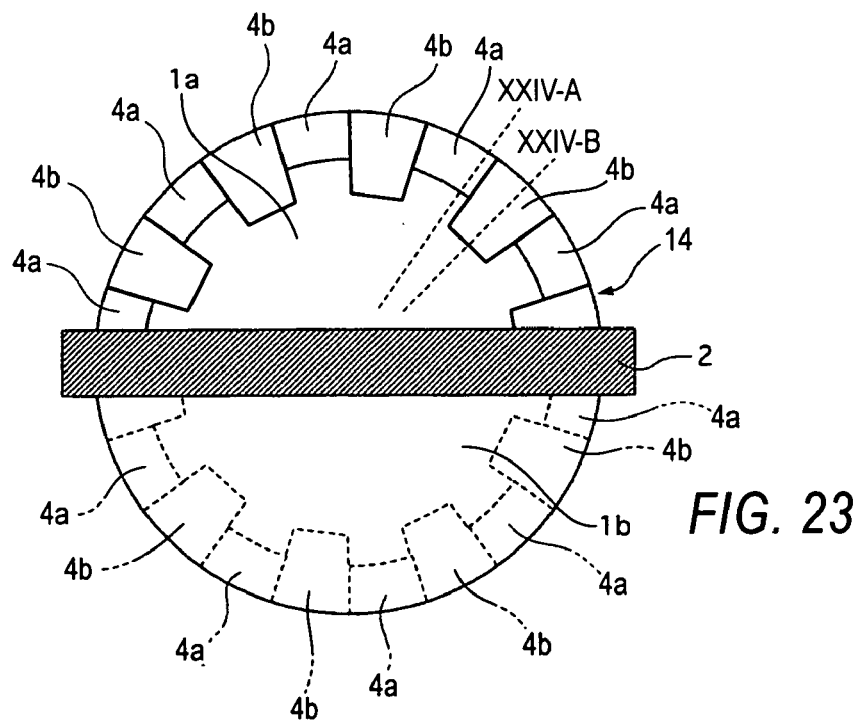
FIG. 23 illustrates the structure of a valve body 25 of the throttle valve according to the Embodiment 16 of the present invention.

Therefore, in the conventional technology (Japanese Laid Open Patent No. 2000-204975), as shown in FIG. 23, the airflow noises, such as the fricatives of air and vibration of the valve body, etc., are controlled by providing the air straightening vanes on the valve body so that the generated air eddy is straightened in order to make the air eddy small.

Figure 3B:
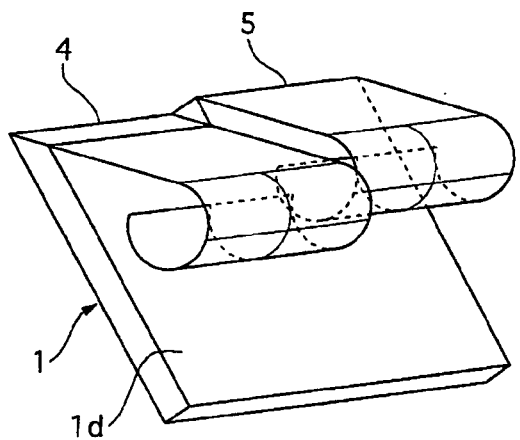

On the other hand, in the throttle valve according to Embodiment 1 of the present invention, as shown in FIGS. 3A and 3B, the first end surface 3 and the second end surface 4 are provided in the outer circumferential surface of the valve body 1 so that a position of an air eddy caused in the downstream of the valve body 1 from the intake air which passes through near the first end surface 4 and that of an air eddy caused from the intake air which passes through near the second end surface 3 are different from each other.

Figure 4A:
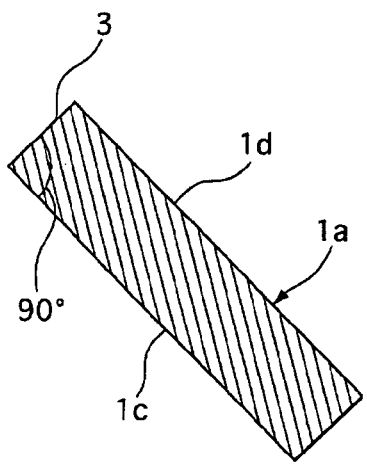
FIGS. 4A and 4B illustrate cross-sectional views of the valve body 1, taken along lines IV-A and IV-B shown in FIG. 1.
Figure 4A:
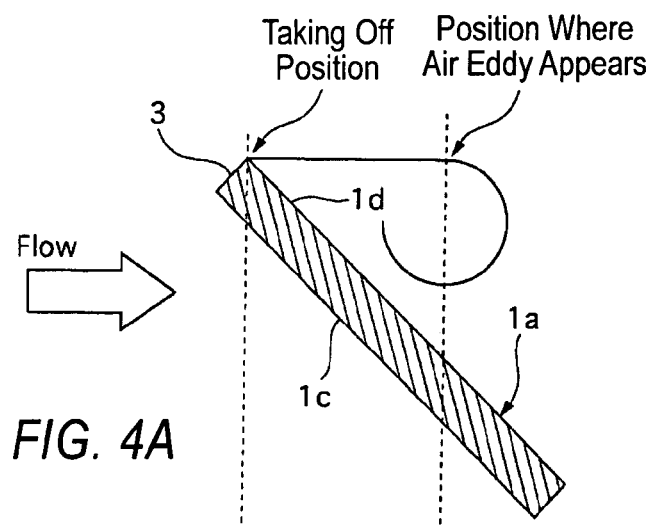
Figure 4B:
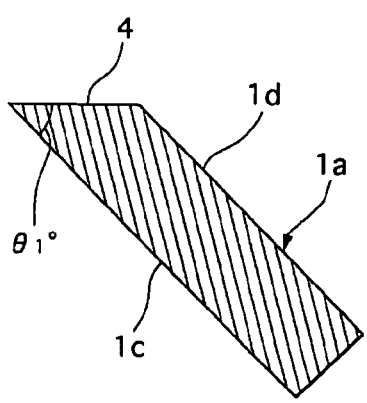
Figure 4B:
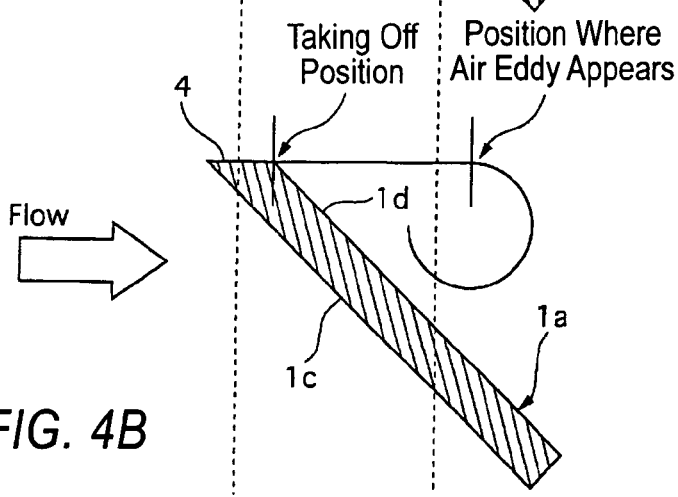

FIGS. 4A and 4B illustrate cross-sectional views of the valve body 1, taken along lines IV-A and IV-B shown in FIG. 1, respectively, wherein a taking off position of a streamline in contact with the second end surface 4 is shifted from a taking off position of a streamline in contact with the first end surface 3 to the downstream side.

Therefore, the air eddy of turbulent airflow generated in the downstream side of the second end surface 4 is shifted more to the downstream side from the position of the turbulent airflow generated in the downstream of the first end surface 3.

That is, since in the embodiment of the present invention, the air eddies are controlled so as not to become large by spreading air eddy occurrence timing, it is possible to suppress the airflow noises without increasing the airflow resistance, as compared with the technology disclosed in Japanese Laid Open Patent No. 2000-204975, in which the projections (air straightening vanes) as shown in FIG. 23 are provided so as to straighten the air eddy only after it appears.

Figures 5A, 5B, 5C:
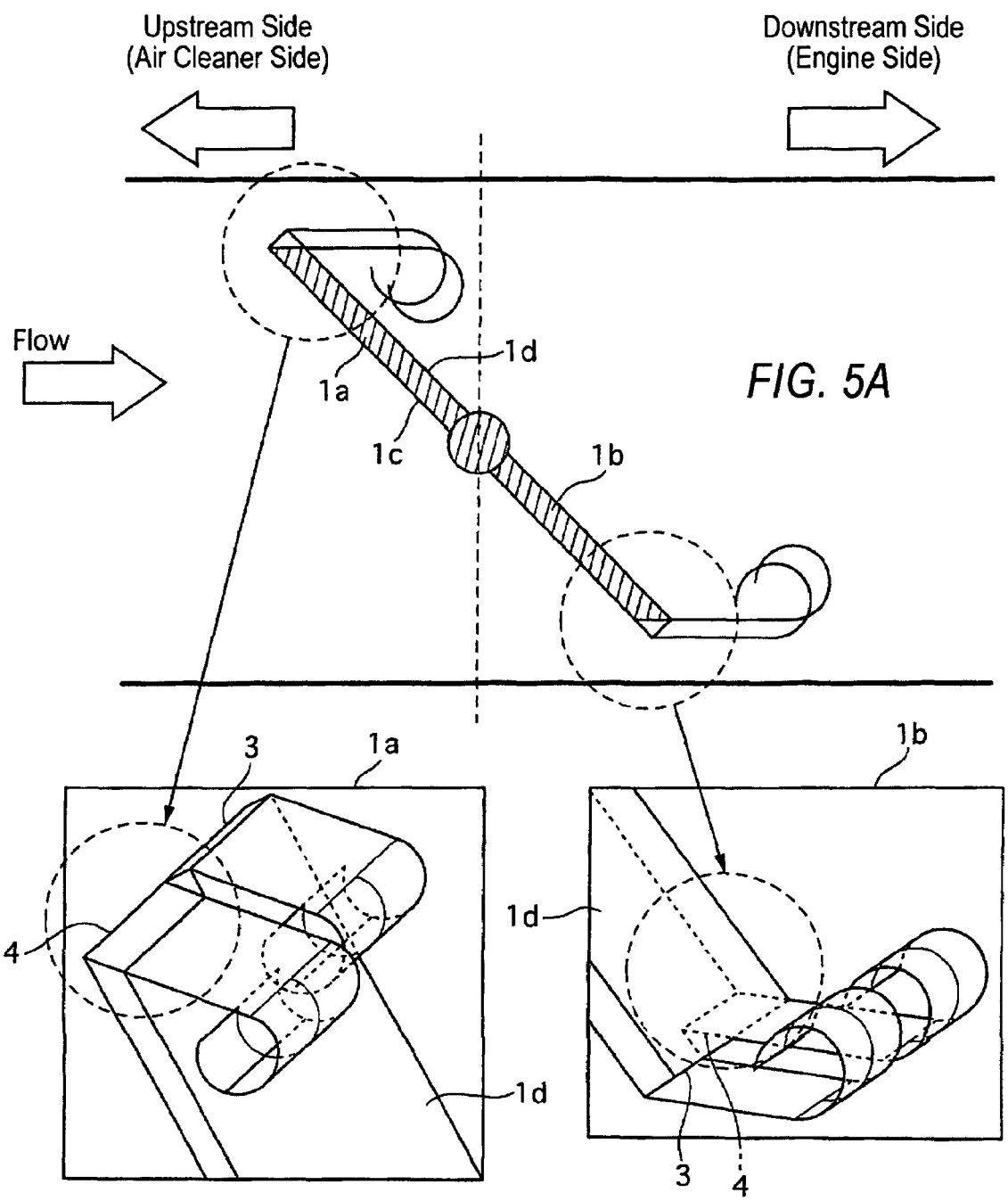
FIGS. 5A, 5B, and 5C illustrate an operation of the throttle valve according to Embodiment 1 of the present invention.

Furthermore, in the throttle valve according to Embodiment 1 of the present invention, since the first end surface 3 is formed on one of left and right half surfaces of the valve body, wherein these sides are virtually divided by a line passing through approximately the middle of the rotational axis 2 of the valve body 1, and the second end surface 4 is formed on the other side, it is possible to spread the timing of air eddies occurrences in the upper and lower portions 1a and 1b, respectively, as shown in FIGS. 5A, 5B, and 5C, so that air eddies that appear in the downstream side of the throttle valve can be controlled so as to become smaller.

Next, effects of the throttle valve according to Embodiment 1 of the present invention will be described below:

(1) Since the throttle valve is capable of controlling the amount of intake air into an engine by changing an gradient angle of the valve body 1 rotatably supported in the intake air passage, wherein the at least one first end surface 3 and the at least one second end surface 4 are formed on the outer circumferential surface of the valve body, so that the air eddies are shifted with respect to each other, it is possible to spread timing of air eddies occurrences in the downstream side of the valve body 1 such that the airflow noises can be controlled to become small without increasing airflow resistance. Specifically, even at adjoining positions, in a positive manner, eddy occurrence positions can be shifted with respect to each other by having different end surfaces. Thus, according to the embodiment of the present invention, eddy occurrence positions are shifted stepwise.

(2) Since in the throttle valve according to the present invention, the valve body may be disc-shaped, corresponding to the shape of the intake air passage, in which the outer circumferential surface of the valve body 1 may comprise the first end surface, and wherein the slot 6 comprising the bottom surface which slopes (at gradient angle $\theta_1$) toward an outer circumferential edge of an outer circumferential end portion of the valve body and the step surface 5 which is in contact with the bottom surface and the first end surface 3, is formed on the outer circumferential end portion, in which the bottom surface is the second end surface 4, it is possible to easily produce the valve body 1 having the first end surface 3 and the second end surface 4 by forming the slot 6 which has a sloped (tapered) end surface, in the outer circumferential end of the disc shaped valve body.

(3) Since the at least first end surface 3 is formed on one of left and right half surfaces of the valve body 1, in which these sides are divided by a line passing through approximately a middle of a rotational axis 2 of the valve body 1, and the second end surface 4 is formed on the other side, it is possible to spread timing of air eddies occurrences in the upper and lower portions 1a and 1b of the valve body 1 respectively, thereby making the produced air eddies relatively small.

Embodiment 2

Figure 6:
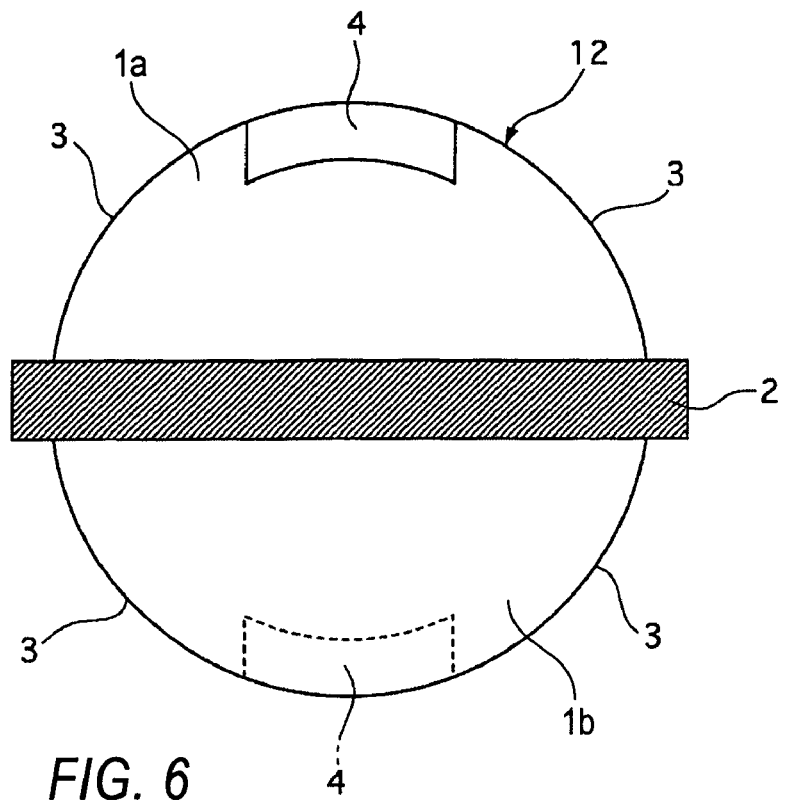
FIG. 6 illustrates a valve body 12 of the throttle valve according to Embodiment 2 of the present invention.

In Embodiment 2 of the present invention, as shown in FIG. 6, a second end surface 4 is formed near the outer circumference end surface in approximately the center of the outer circumferential portion of the valve body 12 in the rotational axis extending direction, and first end surfaces 3 are formed on both sides of the second end surface 4.

FIG. 6 illustrates the valve body 12 of the throttle valve according to the Embodiment 2 of the present invention, wherein the second end surface 4 is formed in the center portion of the valve body 12, and the first end surfaces 3 are formed in the left and right sides of the second end surface 4 so as to sandwich the second end surface 4 therebetween.

Next, operation of Embodiment 2 of the present invention will be described below.

In Embodiment 2 of the present invention, in the upper and lower portions 1a and 1b of the valve body 12, taking off positions of streamlines in contact with the first end surfaces 3 formed in both sides of the second end surface 4 are shifted to the downstream side as compared with a taking off position of a streamline in contact with the second end surface 4. Therefore, it is possible to spread timing of the air eddy occurrence as compared with the Embodiment 1.

Next, effects of the throttle valve according to Embodiment 2 of the present invention will be described below.

In the throttle valve, the effects set forth below are acquired in addition to the effects (1) and (2) described in connection with Embodiment 1.

(4) Since in the throttle valve according to Embodiment 2 of the present invention, the second end surface 4 is formed approximately in the center portion of the valve body 12 in the rotational axis extending direction and the first end surfaces 3 are formed on both sides of the second end surface 4, it is possible to suppress the airflow noises without increasing the airflow resistance.

In other words, three air eddies are generated by intake air which passes through near the two first end surfaces 3 and the one second end surface 4 in the downstream side of the upper portion 1a of the valve body 12. The three air eddies are shifted with respect to each other, so that the three air eddies are smaller than the two air eddies which are generated by the one first end surface 3 and the one second end surface 4 of the valve body 1 of the Embodiment 1, thereby making the produced air flow noises relatively small.

Embodiment 3

Figure 7:
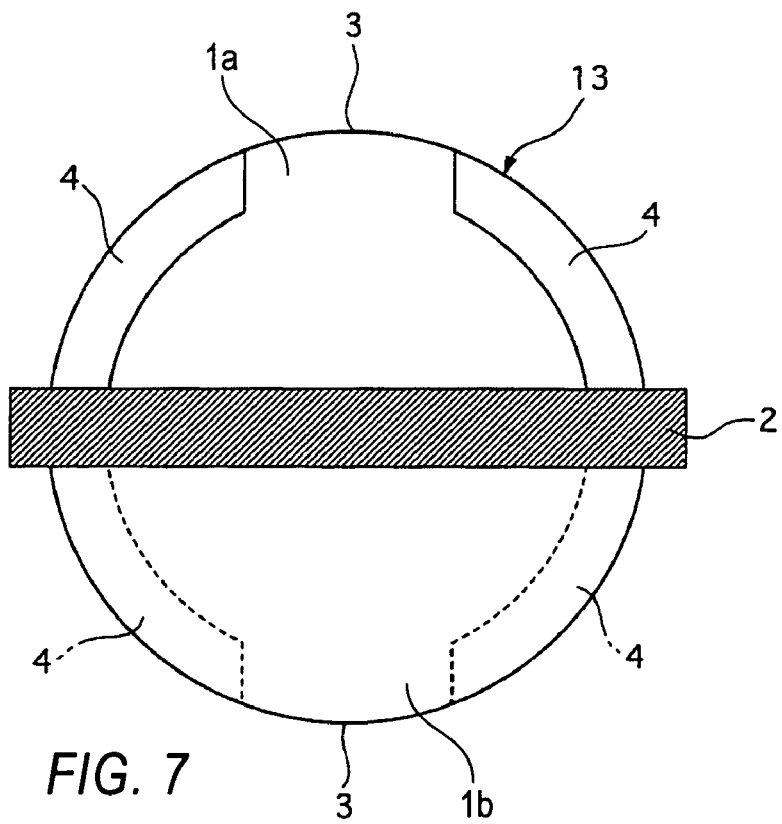
FIG. 7 illustrates a valve body 13 of the throttle valve according to Embodiment 3 of the present invention.

In Embodiment 3 of the present invention, as shown in FIG. 7, a first end surface 3 is formed in a center portion of a valve body 13 in the rotational axis extending direction, and second end surfaces 4 are formed on both sides of the first end surface 3.

FIG. 7 illustrates the valve body 13 of the throttle valve according to the Embodiment 3 of the present invention, wherein the first end surface 3 is formed in the center of the outer circumferential portion of the valve body 13, and the second end surfaces 4 are formed on left and right half sides of the valve body 13 so as to sandwich the first end surface 3 between the second end surfaces 4.

Next, an operation of Embodiment 3 of the present invention will be described below.

In Embodiment 3 of the present invention, in the upper and lower portions 1a and 1b of the valve body 13, taking off positions of streamlines in contact with the two second end surfaces 4 provided on both sides of the first end surface 3 are shifted to the downstream side of the valve body as compared with a taking off position of the streamline in contact with the first end surface 3. Therefore, in Embodiment 3 of the present invention, it is possible to spread air eddies, much more than in Embodiment 1.

Next, effects of the throttle valve according to the Embodiment 3 of the present invention will be described below.

In the throttle valve, the effects set forth below are acquired in addition to the effects (1) and (2) described in connection with Embodiment 1.

(5) Since, the first end surface 3 is formed in the center portion of the valve body 13 in the rotational axis extending direction, and the second end surfaces 4 are formed on both sides of the first end surface 3, it is possible to control the airflow noises without increasing the airflow resistance.

Embodiment 4

In Embodiment 4 of the present invention, as shown in FIG. 8, two or more first end surfaces 3 and two or more second end surfaces 4 are formed at approximately equal intervals in the circumferential direction of a valve body 14.

FIG. 8 illustrates the valve body 14 of the throttle valve according to the Embodiment 4 of the present invention, wherein in the upper portion 1a of the valve body 14, the five first end surfaces 3 and the five second end surfaces 4 are formed at equal intervals, and further in the lower portion 1b of the valve body 14, the five first end surfaces 3 and the five second end surfaces 4 are formed at equal intervals. And the second end surfaces 4 are radially formed from the center of the valve body 14.

Next, an operation of the embodiment will be described below.

In Embodiment 4 of the present invention, the ten first end surfaces 3 and the ten second end surface 4 are formed in the valve body 14 at equal intervals in the circumferential direction. Therefore, since taking off positions of the streamlines shift in the smaller range as shown in FIGS. 9A and 9B, smaller air eddies occur as compared with Embodiments 1–3.

Moreover, a cutting operation of these slots is easy when forming these slots on a disk-like valve body as the second end surfaces 4, since the second end surfaces 4 are radially formed from the center of the valve body 14 in Embodiment 4 of the present invention.

Next, effects of the throttle valve according to Embodiment 4 of the present invention will be described below.

In the throttle valve, the effects set forth below are acquired in addition to the effects (1) and (2) described in connection with Embodiment 1.

(6) Since two or more first end surfaces 3 and two or more second end surfaces 4 (ten of each are shown in FIG. 8) are formed in the circumferential direction of the valve body 14, smaller air eddies can be generated and the airflow noises of the throttle valve can be reduced, without increasing the airflow resistance.

(7) Further, since the first end surfaces 3 and the second end surfaces 4 are radially formed from the center of the valve body 14, the valve body 14 can be manufactured more easily.

Embodiment 5

Figure 10:
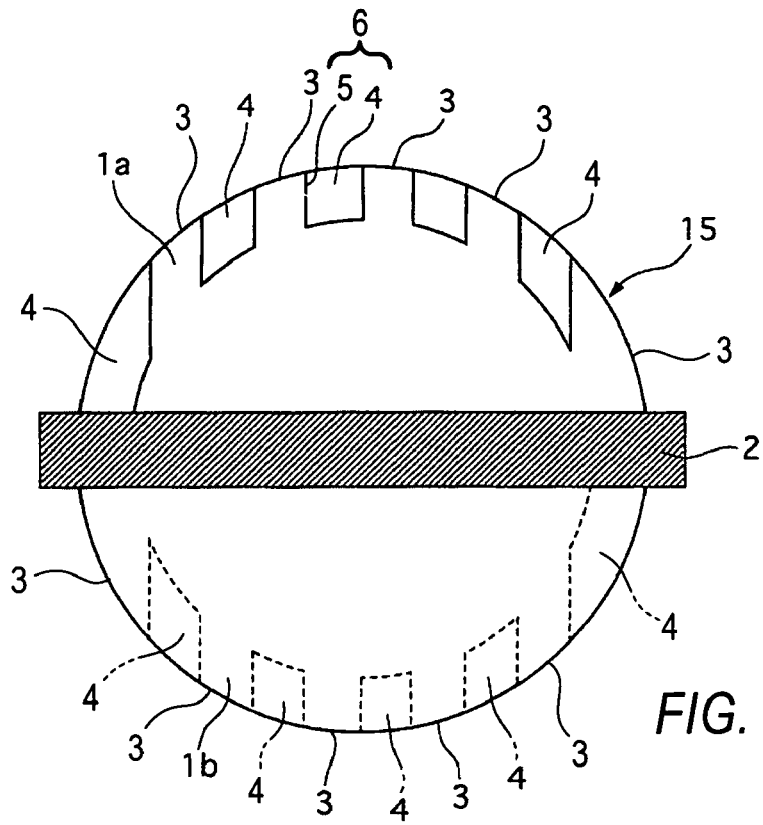
FIG. 10 illustrates a valve body 15 of the throttle valve according to Embodiment 5 of the present invention.

As shown in FIG. 10, the structure of a valve body 15 according to Embodiment 5 of the present invention is different from that of Embodiment 4 of the present invention, in that the slots 6 are formed approximately perpendicularly to the rotational axis 2 in the outer circumferential portion of the valve body 15. In other words, the second end surfaces 4 of the slots 6 are formed along with a streamline direction of intake air.

FIG. 10 illustrates a valve body 15 of the throttle valve according to Embodiment 5 of the present invention, wherein the ten first end surfaces 3 and the ten second end surfaces 4 are provided at equal intervals in the direction perpendicular to the rotational axis extending direction, that is, along with the streamline direction of the intake air.

Next, an operation of the embodiment will be described below.

Since the streamline direction of the intake air which passes through the throttle valve changes according to the surface shape of the valve body 15, in order to reduce the airflow resistance, it may be necessary to form the surface shape so as not to change the streamline of the intake air as much as possible.

Next, effects of the throttle valve according to Embodiment 5 of the present invention will be described below.

In the throttle valve, the effects set forth below are acquired in addition to the effects described in connection with Embodiment 4.

(8) Since the first end surfaces 3 and the second end surfaces 4 are formed along with the streamline direction of the intake air, the airflow resistance can be reduced, and the gas mileage can be improved.

Embodiment 6

Figure 11:
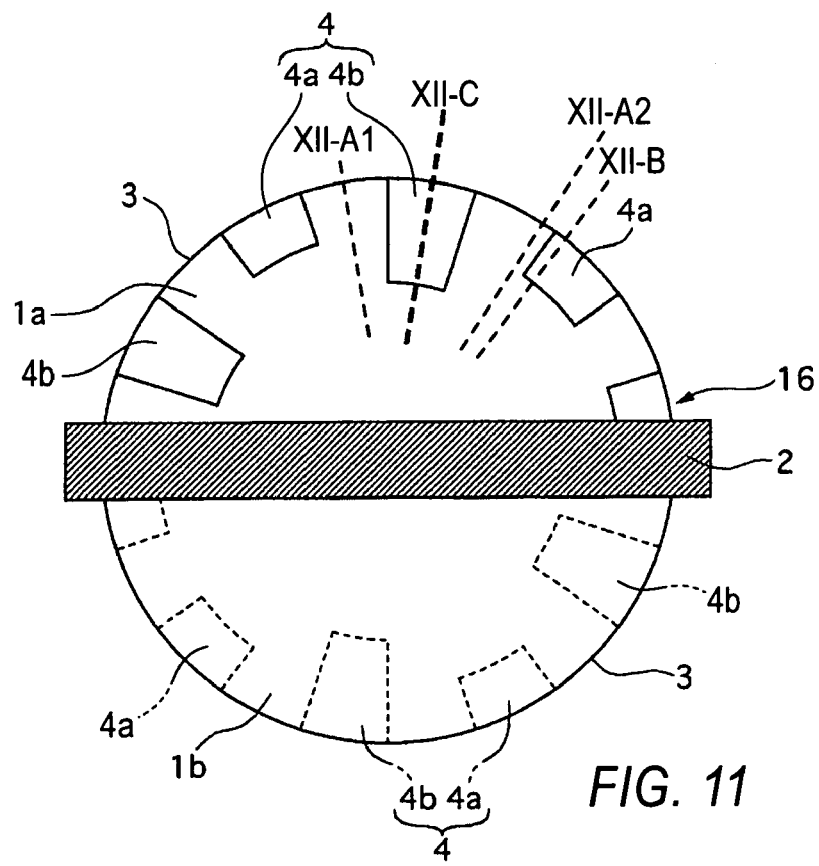
FIG. 11 illustrates a valve body 16 of the throttle valve according to Embodiment 6 of the present invention.
Figure 12B:
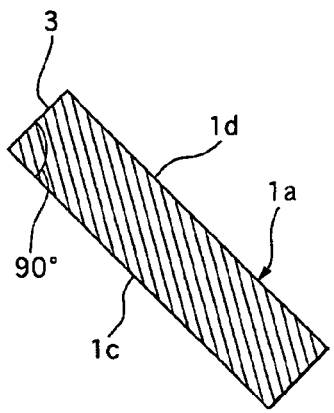
Figure 12B:
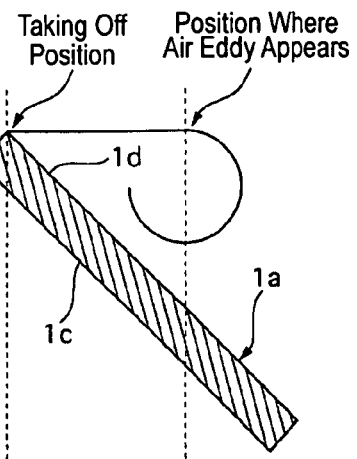
Figure 12B:
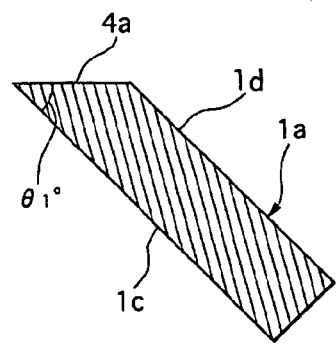
Figure 12B:
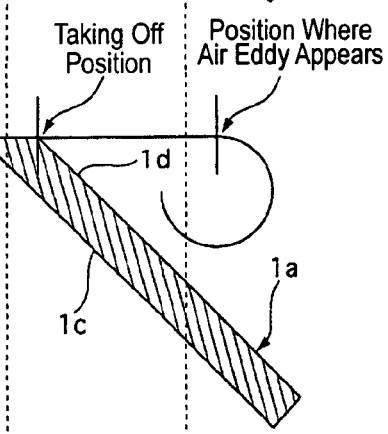
Figure 12C:
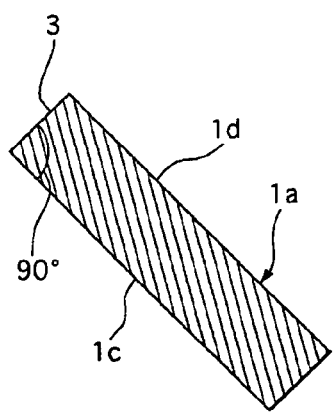
Figure 12C:
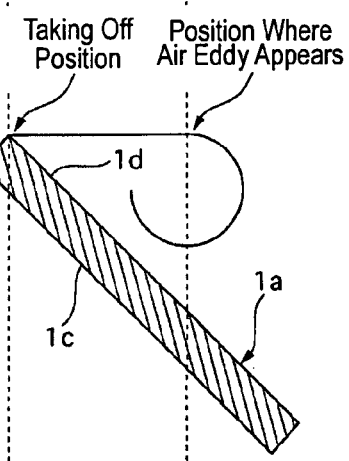
Figure 12C:
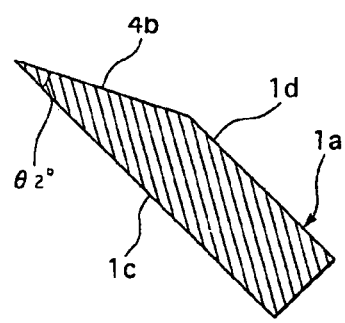
Figure 12C:
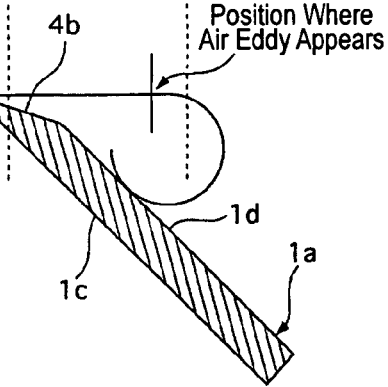

In Embodiment 6 of the present invention, as shown in FIG. 11, the lengths in a radial direction of adjoining second end surfaces 4 are different from each other.

FIG. 11 illustrates a valve body 16 of the throttle valve according to Embodiment 6 of the present invention, wherein the structure of the valve body 16 is different from that of Embodiment 4 shown in FIG. 8, in that the second end surfaces 4a and 4b have lengths in a radial direction that are different from each other and are formed in an alternating manner.

The second end surfaces 4a have the gradient angle $\theta_1$ with respect to the upstream side surface 1c.

On the other hand, since the length of the second end surfaces 4b is approximately twice the length of the first end surface 4a in the radial direction, the gradient angle $\theta_2$ of the second end surface 4b is smaller than the gradient angle $\theta_1$ with respect to the upstream and downstream side surfaces 1c. The gradient angle $\theta_1$ may be described an angle at which a streamline does not take off at an upstream end portion (edge) of the end surface, that is, the streamline takes off at a downstream end portion (edge) of the end surface, while the gradient angle $\theta_2$ may be described as an angle at which a streamline takes off at an upstream end portion of the valve.

Next, an operation of the embodiment will be described below.

FIGS. 12A1, 12A2, 12B, and 12C illustrate sectional views of the valve body 16, taken along lines XII-A1, XII-A2, XII-B, and XII-C shown in FIG. 11 respectively, wherein a taking off position of a stream line in contact with the second end surface 4a is shifted to the downstream side as compared with a taking off position of a streamline in contact with the first end surface 3.

On the other hand, a taking off position of a streamline in contact with the second end surface 4b is shifted to the upstream side from the taking off position of the streamline in contact with the first end surface 3.

That is, since the position where an air eddy is generated from the intake air passing through the second end surface 4a is shifted to the downstream side of the valve body 16, and the position where an air eddy is generated from the intake air passing through the second end surface 4b is shifted to the upstream side of the valve body, as compared with a position where an air eddy is generated by the intake air passing through the first end surface 3, the position where the air eddy is generated is divided into three positions in an upper side 1a and in the lower side 1b, respectively, so that the positions where the air eddies are generated in both sides are divided into twenty positions.

Next, effects of the throttle valve according to Embodiment 6 of the present invention will be described below.

In the throttle valve, the effects set forth below are acquired in addition to the effects (1) and (2) described in connection with Embodiment 4.

(9) Since the lengths of the adjoining second end surfaces 4a and 4b in the radial direction are different from each other, timing of air eddies occurrences in the downstream side of the throttle valve is spread so as to make the air eddies relatively small and to make the airflow noises of the throttle valve small without increasing the airflow resistance.

Embodiment 7

Figure 13:
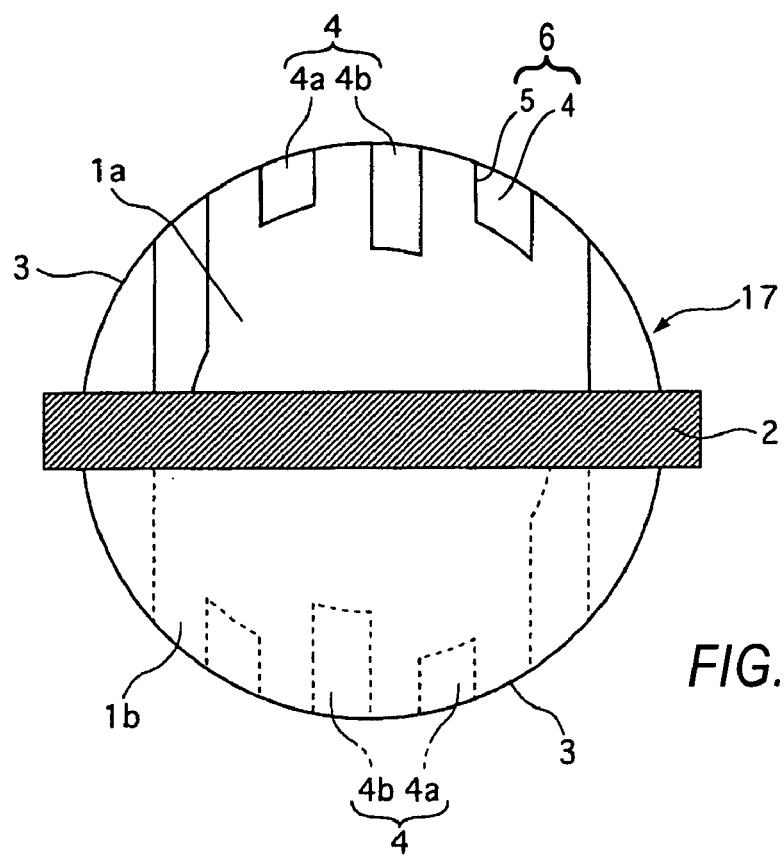
FIG. 13 illustrates a valve body 17 of the throttle valve according to Embodiment 7 of the present invention.

As shown in FIG. 13, the structure of a valve body 17 according to Embodiment 7 of the present invention differs from that of Embodiment 6, in that the slots 6 are formed approximately perpendicularly to the rotational axis 2 in the outer circumferential portion of the valve body 17. In other words, the second end surfaces 4 of the slots 6 are formed along with the streamline direction of intake air.

FIG. 13 illustrates the valve body 17 of the throttle valve according to Embodiment 7 of the present invention, wherein the first end surfaces 3 and the second end surfaces 4 are provided in the upper portion 1a and the lower portion 1b, respectively, at equal intervals in a direction perpendicular to the rotational axis extending direction, that is, along with the streamline direction of the intake air.

Moreover, the second end surfaces 4 include at least second end surfaces 4a and 4b whose lengths in the direction perpendicular to the rotational axis 2 extending direction differ from each other by turns.

Next, an operation of Embodiment 7 will be described below.

A taking off position of the stream line in contact with the second end surface 4a is shifted to the downstream side of the throttle valve, as compared with a taking off position of a streamline in contact with the first end surface 3, and, a taking off position of a streamline in contact with the second end surface 4b is shifted to the upstream side from the taking off position of the streamline in contact with the first end surface 3. Therefore, the position where the air eddy is generated in each of the upper and lower portions 1a and 1b is divided into three positions, so that the positions where the air eddies are generated in both sides are divided into twenty positions.

Since the first end surfaces 3 and the second end surfaces 4 are formed along with the streamline direction of the intake air, the airflow resistance can be reduced as compared with Embodiment 6.

Next, effects of the throttle valve according to Embodiment 7 of the present invention will be described below.

In the throttle valve, the effects set forth below are acquired in addition to the effects described in connection with Embodiment 6.

(10) Since the second end surfaces 4 are formed along with the streamline direction of the intake air, the airflow resistance can be reduced and the gas mileage can be improved.

Embodiment 8

Figure 14:
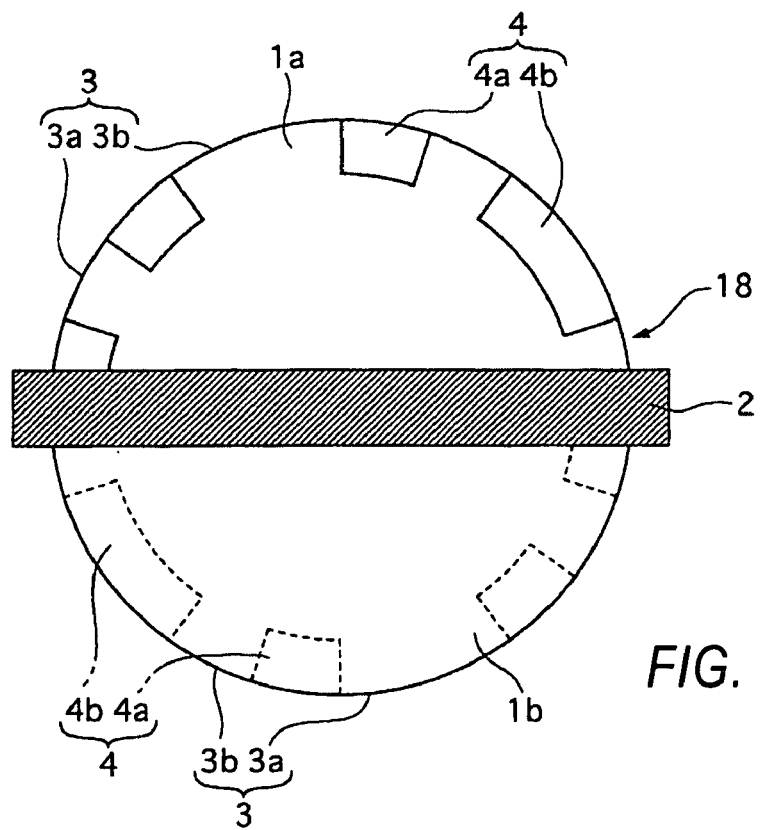
FIG. 14 illustrates a valve body 18 of the throttle valve according to Embodiment 8 of the present invention.

In Embodiment 8 of the present invention, as shown in FIG. 14, two or more first end surfaces 3 and two or more second end surfaces 4 are formed at unequal intervals in the circumferential direction of a valve body 18.

FIG. 14 illustrates the valve body 18 of the throttle valve according to Embodiment 8 of the present invention. In the figure, the first end surface 3 includes at least a first end surface 3a and a first end surface 3b, wherein the length of the first end surface 3b in circumferential direction is, for example, approximately twice the length of the first end surface 3a.

Furthermore, a second end surface 4 includes at least a second end surface 4a and a second end surface 4b, wherein the length of the second end surface 4a in circumferential direction is, for example, approximately twice the length of the second end surface 4a.

Next, an operation of the embodiment will be described below.

Figure 15A:
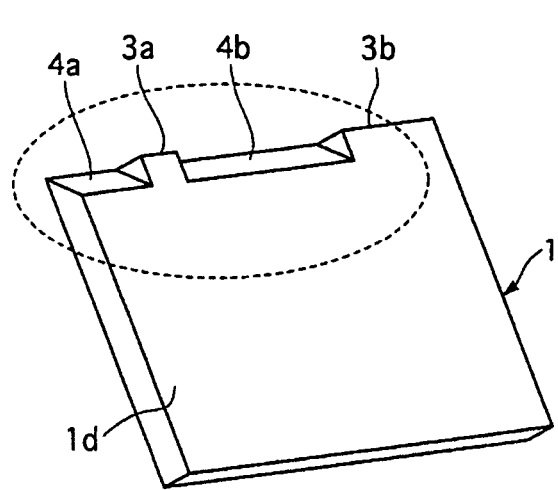
FIGS. 15A and 15B illustrate an outer circumferential end portion according to Embodiment 8 of the present invention.
Figure 15B:
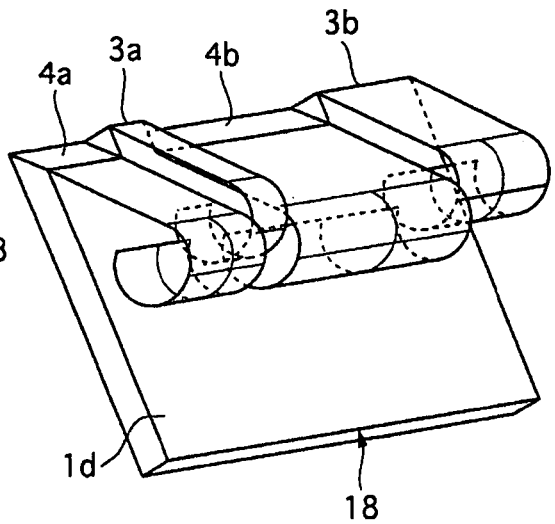

In Embodiment 8 of the present invention, since the eight first end surfaces 3 and the eight second end surfaces 4 are formed at unequal intervals in the circumferential direction of the valve body 18, as shown in FIGS. 15A and 15B, the sizes of the air eddies which are generated in downstream of the first end surfaces 3a and 3b are different from each other.

Therefore, in the Embodiment 8 of the present invention, while the positions where adjoining air eddies are generated are different from each other, the sizes of the air eddies are different from each other, whereby it is possible to prevent large air eddies from being generated.

Next, effects of the throttle valve according to Embodiment 8 of the present invention will be described below.

In the throttle valve, the effects set forth below are acquired in addition to the effects (1) and (2) described in connection with Embodiment 1 of the present invention and those described in connection with Embodiment 4.

(11) Since two or more first end surfaces 3 and two or more second end surfaces 4, are formed in the circumferential direction of the valve body 18 at unequal intervals, it is possible to limit generation of large air eddies downstream of the throttle valve by making the sizes of the air eddies different where an air eddies occur so that the airflow noises can be controlled.

Embodiment 9

Figure 16:
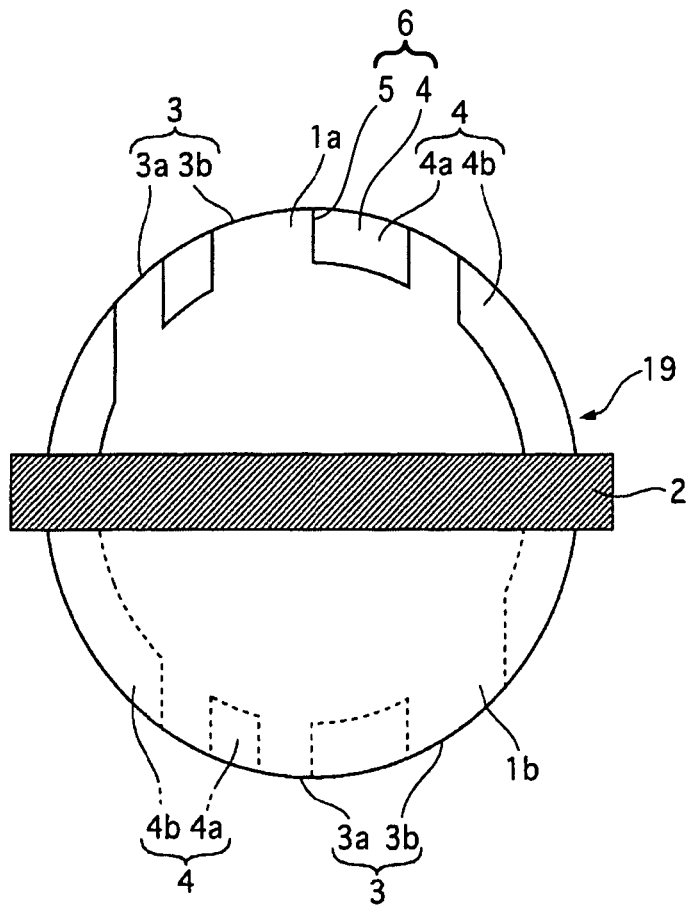
FIG. 16 illustrates a valve body 19 of the throttle valve according to Embodiment 9 of the present invention.

As shown in FIG. 16, the structure of a valve body 19 according to Embodiment 9 of the present invention differs from that of Embodiment 8, in that the slots 6 are formed approximately perpendicularly to the rotational axis 2 in the outer circumferential portion of the valve body 19. In other words, the second end surfaces 4 of the slots 6 are provided along with the streamline direction of intake air.

FIG. 16 illustrates the valve body 19 of the throttle valve according to the Embodiment 9 of the present invention, wherein six first end surfaces 3 including at least first end surfaces 3a and 3b and eight second end surfaces 4 comprising second end surfaces 4a and 4b are provided at unequal intervals in the circumferential direction of the valve body 19. The slots 6 are formed perpendicularly to the rotational axis 2 extending direction. In the other words, the second end surface 4 of the slots 6 are formed along with the streamline direction of the intake air.

Next, an operation of the embodiment will be described below.

In Embodiment 9 of the present invention, the six first end surfaces 3 and the eight second end surfaces 4 are formed at unequal intervals in the circumferential direction of the valve body 19. Therefore, in Embodiment 9 of the present invention, while the positions where adjoining air eddies are generated are different from one another, the sizes of the air eddies are different, so that generation of large air eddies can be controlled.

Moreover, since the second end surfaces 4 are formed along with the streamline direction of the intake air, the airflow resistance can be controlled so as to become smaller than in Embodiment 8.

Next, effects of the throttle valve according to Embodiment 9 of the present invention will be described below.

In the throttle valve, the effects set forth below are acquired in addition to the effects described in connection with Embodiment 8.

(12) Since the second end surfaces 4 are formed along with the streamline direction of the intake air, the airflow resistance can be reduced, and the gas mileage can be improved.

Embodiment 10

Figure 17:
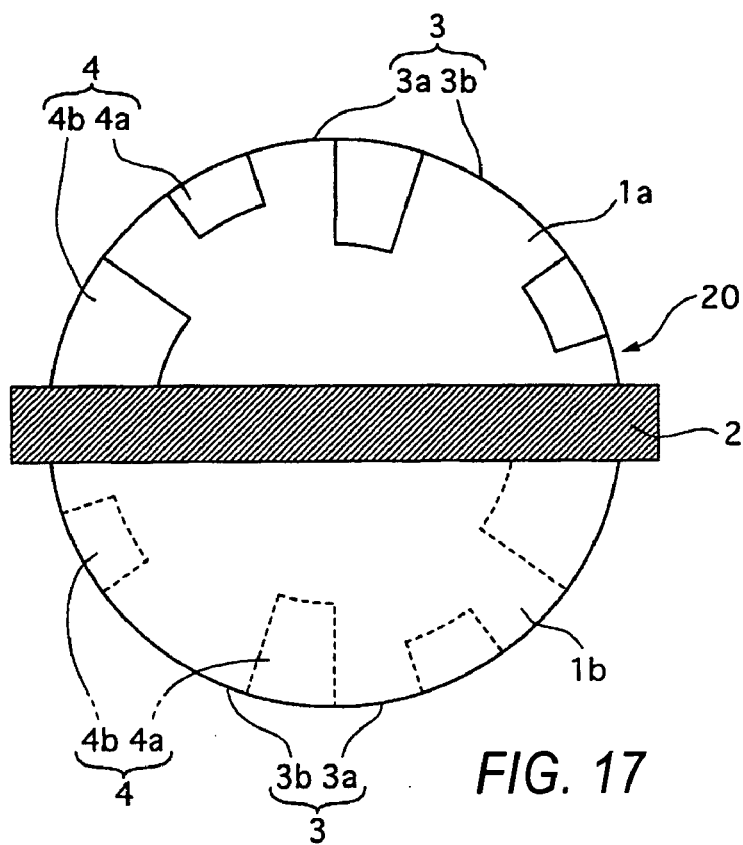
FIG. 17 illustrates a valve body 20 of the throttle valve according to Embodiment 10 of the present invention.

In Embodiment 10 of the present invention, as shown in FIG. 17, the lengths in the circumferential direction of adjoining first end surfaces are different from each other, and the lengths in the radial direction and circumferential direction of the adjoining second end surfaces are different from each other.

FIG. 17 illustrates a valve body 20 of the throttle valve according to Embodiment 10 of the present invention. The first end surface 3 includes at least first end surfaces 3a and 3b and the second end surface 4 includes at least second end surfaces 4a and 4b, wherein the lengths in the circumferential direction of adjoining first end surfaces 3a and 3b are different from each other, and the lengths in the radial direction and circumferential direction of the second end surfaces 4a and 4b are different from each other, and further the second end surfaces 4 are radially formed.

Next, an operation of the embodiment will be described below.

In Embodiment 10 of the present invention, since, in the upper portion 1a and lower portion 1b of the valve body 20, the lengths in the circumferential direction of adjoining first end surfaces 3a and 3b are different from each other, and the lengths in the radial direction and circumferential direction of the second end surfaces 4a and 4b are different from each other, the airflow noises of the throttle valve can be made smaller than that in Embodiment 8.

Next, effects of the throttle valve according to the Embodiment 10 of the present invention will be described below.

In the throttle valve according to the Embodiment 10 of the present invention, the effects set forth below are acquired in addition to the effects described in connection with Embodiment 8.

(13) Since the lengths in the circumferential direction of adjoining first end surfaces 3a and 3b are different from each other, and the lengths in the radial direction and circumferential direction of the adjoining second end surfaces 4a and 4b are different from each other, it is possible to spread timing of air eddies occurrences in the downstream side of the throttle valve so as to make the air eddies relatively small, and the airflow noises of the throttle valve can be reduced without increasing airflow resistance.

Embodiment 11

Figure 18:
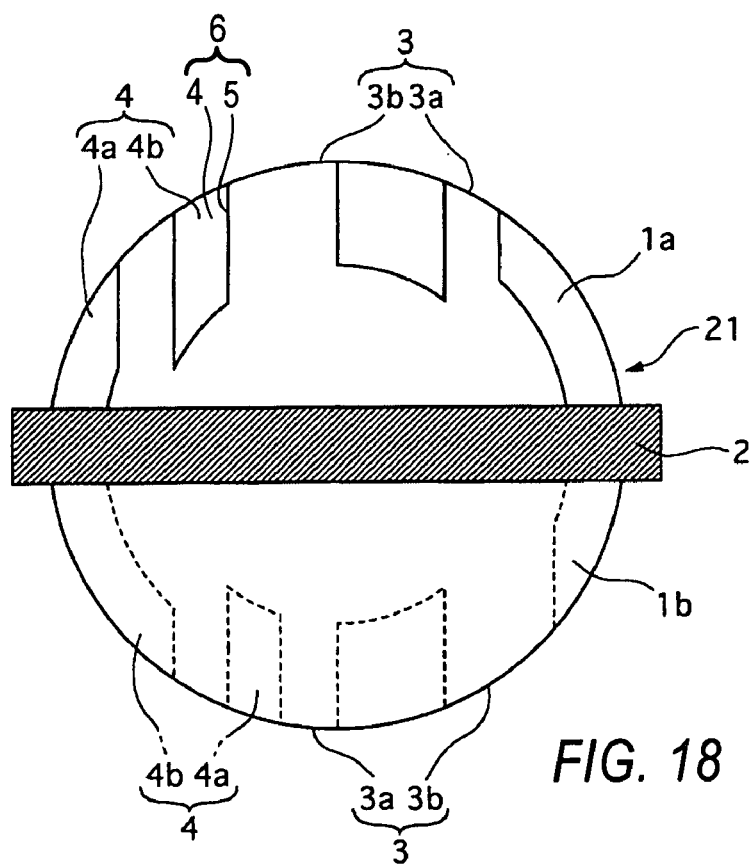
FIG. 18 illustrates a valve body 21 of the throttle valve according to Embodiment 11 of the present invention.

As shown in FIG. 18, the structure of a valve body 21 according to Embodiment 11 of the present invention is different from that according to Embodiment 10 of the present invention, in that the slots 6 are formed approximately perpendicularly to the rotational axis 2 in the outer circumferential portion of the valve 21. In other words, the second end surfaces 4 are formed in a streamline direction of an intake air.

FIG. 18 illustrates the valve body 21 of the throttle valve according to Embodiment 11 of the present invention. The first end surface 3 includes at least first end surfaces 3a and 3b and the second end surface 4 includes at least second end surfaces 4a and 4b, wherein the lengths in the circumferential direction of the adjoining first end surfaces 3a and 3b are different from each other, and the lengths in the radial direction and circumferential direction of the second end surfaces 4a and 4b are different from each other, and further the second end surfaces 4 are formed along with the streamline direction of the intake air.

Next, effects of the throttle valve according to Embodiment 11 of the present invention will be described below.

In the throttle valve, the effects set forth below are acquired in addition to the effects described in connection with Embodiment 10.

(14) Since the second end surfaces 4 are formed along with the streamline direction of the intake air, the airflow resistance can be reduced, and the gas mileage can be improved.

Embodiment 12

Figure 19:
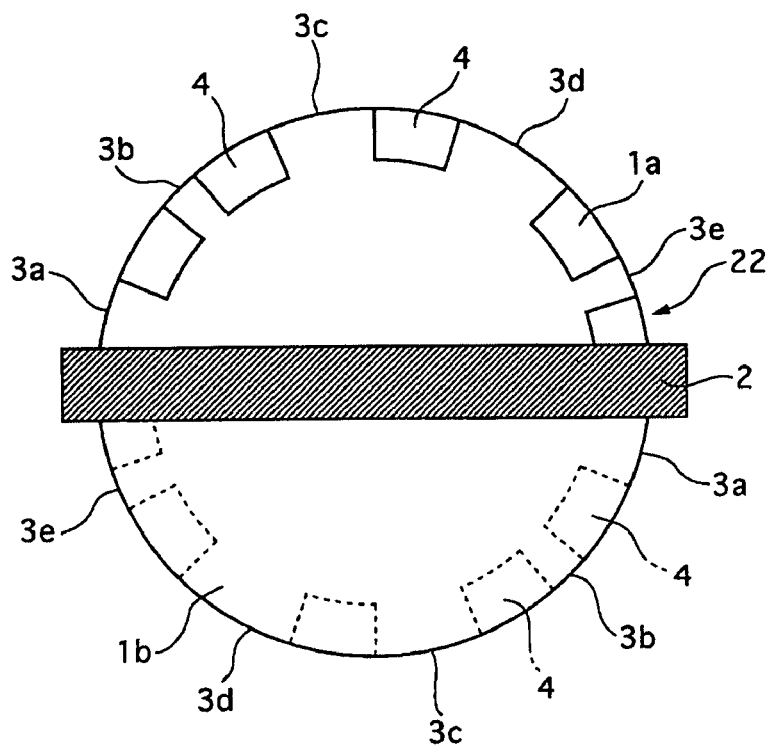
FIG. 19 illustrates a valve body 22 of the throttle valve according to Embodiment 12 of the present invention.

As shown in FIG. 19, the structure of a valve body according to Embodiment 12 of the present invention differs from that according to Embodiment 4 of the present invention, in that the lengths of the first end surfaces in the circumferential direction of the valve body are different from one another.

FIG. 19 illustrates the valve body 22 of the throttle valve according to Embodiment 12 of the present invention, wherein the lengths in the circumferential direction of the first end surfaces 3a to 3e are different from one another, and the second end surfaces 4 having the same length in the circumferential direction are formed therebetween. The second end surfaces 4 are radially formed from the center of the valve body 21.

Next, an operation of the embodiment will be described below.

In the Embodiment 12 of the present invention, since, in the upper portion 1a and the lower portion 1b of the valve body 1, since the lengths in the circumferential direction of the first end surfaces 3a to 3e are different from one another, sizes of adjoining air eddies are different from one another. Therefore, it is possible to prevent large air eddies from being generated.

Next, effects of the throttle valve according to Embodiment 12 of the present invention will be described below.

In the throttle valve, the effects set forth below are acquired in addition to the effects described in connection with Embodiment 4.

(15) Since the lengths in the circumferential direction of the first end surfaces 3a to 3e are different from one another, the sizes of the air eddies are different from one another, and it is possible to prevent from large air eddies from being generated. It is possible to reduce airflow noise of the throttle valve.

Embodiment 13

Figure 20:
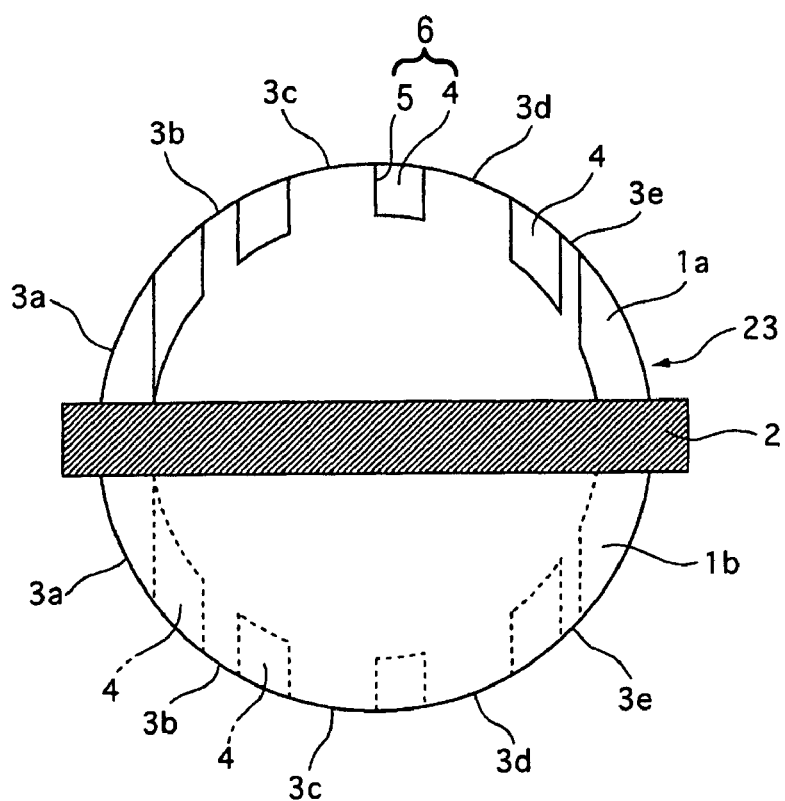
FIG. 20 illustrates the structure of a valve body 23 of the throttle valve according to Embodiment 13 of the present invention.

As shown in FIG. 20, the structure of a valve body according to Embodiment 13 of the present invention differs from that according to Embodiment 12 of the present invention, in that the second end surfaces 4 are formed along with a streamline direction of intake air.

FIG. 20 illustrates the structure of a valve body 23 of the throttle valve according to Embodiment 13 of the present invention, wherein the slots 6 are formed approximately perpendicularly to the rotational axis 2 in the outer circumferential portion of the valve body 23. In other words, the second end surfaces 4 of the slots 6 are formed along with a streamline direction of the intake air.

Therefore, the airflow resistance is controlled to become smaller than in the Embodiment 12.

Next, effects of the throttle valve according to Embodiment 13 of the present invention will be described below.

In the throttle valve according to the Embodiment 13 of the present invention, the effects set forth below are acquired in addition to the effects described in connection with Embodiment 12.

(16) Since the second end surfaces 4 are formed along with the streamline direction of the intake air, the airflow resistance can be reduced, and the gas mileage can be improved.

Embodiment 14

Figure 21:
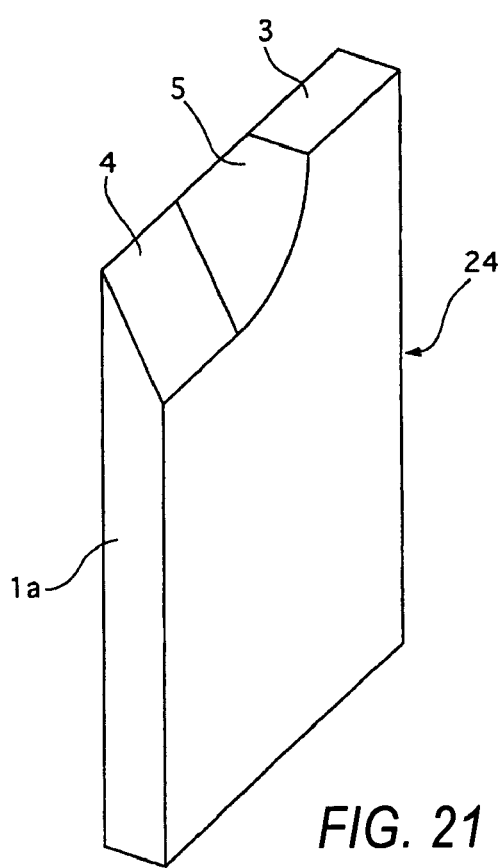
FIG. 21 illustrates the structure of a valve body 24 of the throttle valve according to Embodiment 14 of the present invention.

In Embodiment 14 of the present invention, as shown in FIG. 21, a step surface 5 is curved, and smoothly connected to a second end.

FIG. 21 illustrates the structure of a valve body 24 of the throttle valve according to Embodiment 14 of the present invention, wherein a fillet processing is performed to the second end surface 4 and the step surface 5, so that the step surface 5 is seamlessly (without a step) connected to the second end surface 4.

Next, an operation of the embodiment will be described below.

In Embodiment 14 of the present invention, since there is no seam (step) between the second end surface 4 and the step surface 5, it is possible to reduce changes of intake air in a streamline direction so as to control turbulent airflow, and the airflow resistance can be reduced.

Next, effects of the throttle valve according to Embodiment 1 of the present invention will be described below.

In the throttle valve, the effects set forth below are acquired.

(17) Since the step surface 5 is curved and smoothly connected to the second end surface 4, it is possible to reduce adverse effects to the airflow in the streamline direction so as to prevent turbulent airflow, and the airflow resistance can be reduced so that the gas mileage can be improved.

Embodiment 15

Figure 22:
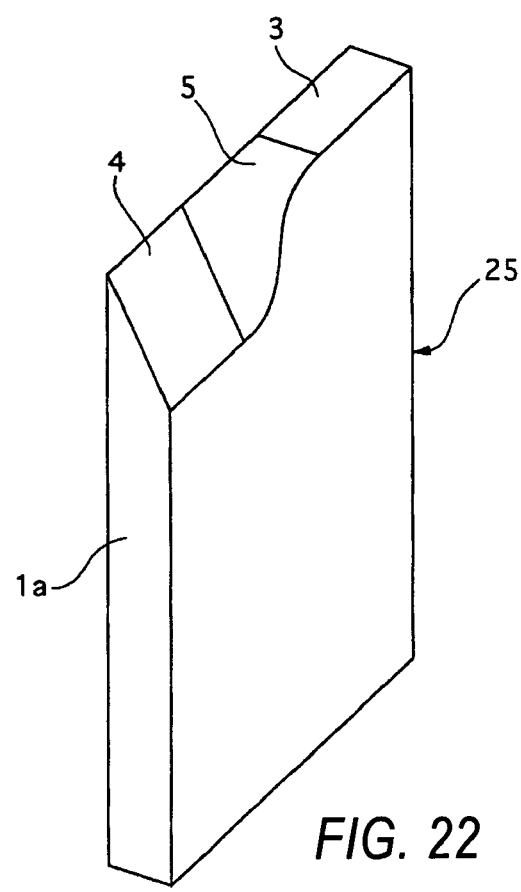
FIG. 22 illustrates the structure of a valve body 25 of the throttle valve according to the Embodiment 15 of the present invention.

In Embodiment 15 of the present invention, as shown in FIG. 22, the step surface 5 is curved and is smoothly connected to the first end surface 3 and the second end surface 4.

FIG. 22 illustrates the structure of a valve body 25 of the throttle valve according to Embodiment 15 of the present invention, wherein the step surface 5 is formed as a curved surface, and connected to the first end surface 3 and the second end surface 4 without seams or steps.

Next, an operation of the embodiment will be described below.

In Embodiment 15 of the present invention, since there is no seam (step) between the first end surface 3 and the step surface 5, and between the second end surface 4 and the step surface 5, it is possible to control turbulent airflow even more than in Embodiment 14 of the present invention, and the airflow resistance can be reduced.

Next, effects of the throttle valve according to Embodiment 15 of the present invention will be described below.

In the throttle valve according to Embodiment 15 of the present invention, the effects set forth below are acquired.

(18) Since the step surface 5 is curved so as to smoothly connect the first end surface 3 and the second end surface 4, it is possible to reduce adverse effects to the airflow of intake air in the streamline direction and the airflow resistance can be reduced so that the gas mileage can be improved.

Embodiment 16

In Embodiment 16 of the present invention, as shown in FIG. 23, instead of forming the first end surface 3, two or more second end surfaces 4a and 4b having different gradient angles are formed at approximately equal intervals in the circumferential direction of a valve body 14.

FIG. 23 illustrates the valve body 24 of the throttle valve according to the Embodiment 16 of the present invention, wherein the ten second end surfaces 4a and ten second end surfaces 4b are formed at equal intervals in the upper and lower portions 1a and 1b of the valve body 24. And the second end surfaces 4 are radially formed from the center of the valve body 24.

Next, an operation of the embodiment will be described below.

Figure 24A:
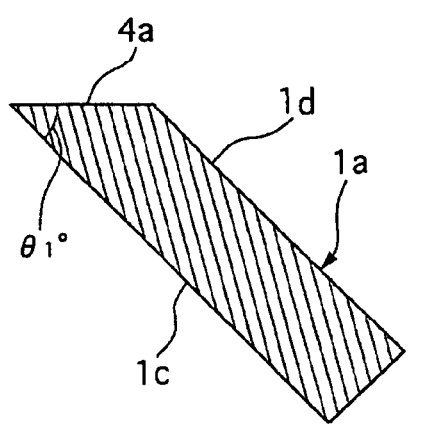
FIGS. 24A and 24B illustrate cross-sectional views of valve body, taken along lines XXIVA and XXIVB shown in FIG. 23.
Figure 24A:
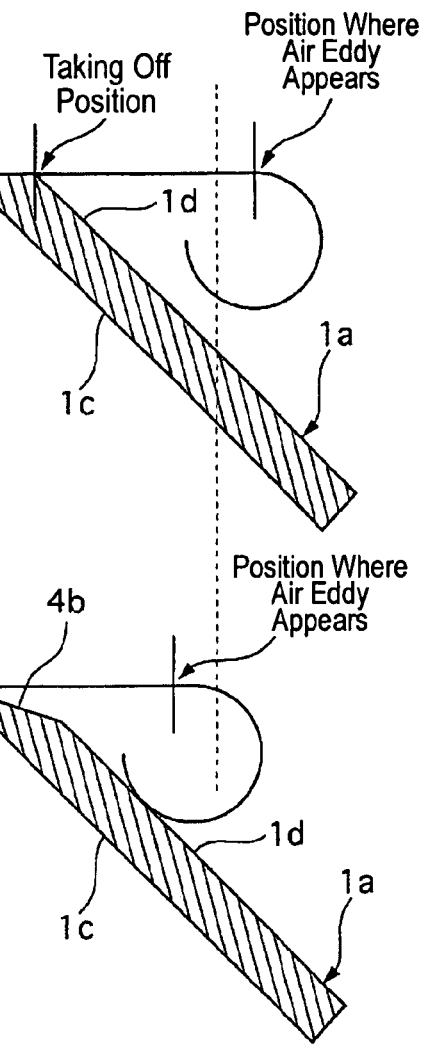
Figure 24B:
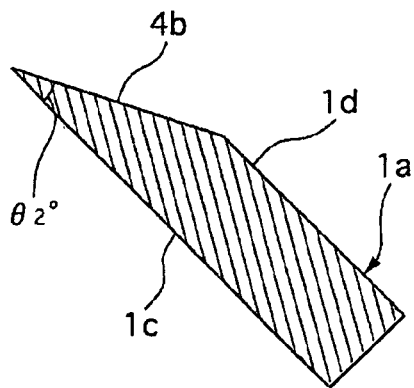
Figure 25:
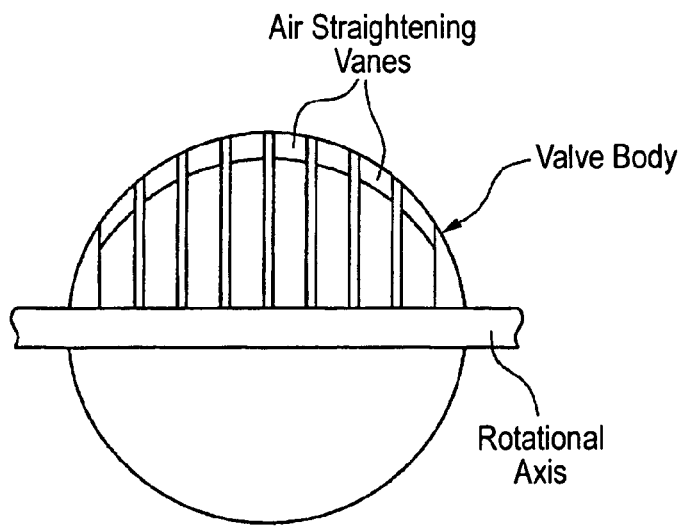
FIG. 25 illustrates the structure of a conventional prior art valve body.

In Embodiment 16 of the present invention, the ten second end surfaces 4a and the ten second end surface 4b are formed in the valve body 24 at equal intervals in the circumferential direction. Therefore, since taking off positions of the streamlines shift in the smaller range as shown in FIGS. 24A and 24B, smaller air eddies occur as compared with Embodiments 1–3.

Moreover, a cutting operation of these slots is easy when forming these slots on a disk-like valve body as the second end surfaces 4a and 4b, since the second end surfaces 4 are radially formed from the center of the valve body 24 in Embodiment 16 of the present invention.

In the throttle valve according to the embodiment of the present invention, the same effects as that of Embodiment 4 are acquired. In addition, a distance between the eddies that occur in the upstream side of the valve body and those that occur in the downstream side of the valve body can be made longer than that in Embodiment 4 so that it is possible to prevent these eddies from joining together.

In addition to the second end surfaces 4a and 4b, at least one first end surface may be formed in the valve body. Further, the second end surfaces 4a and 4b may be formed in a direction perpendicular to the rotational axis 2 in the outer circumferential portion of the valve body 24. Furthermore, the length of the second end surfaces 4a and/or 4b may be different from one another. Moreover, the circumferential length of the second end surfaces 4a and/or 4b may be different from each other. The length of adjacent ones of the second surfaces 4a or 4b may be different.

Other Embodiments

As mentioned above, although the best forms for carrying out the present invention are explained in connection with Embodiments 1 to 15, the present invention is not limited to these embodiments. For example, the first end surface and the second end surface can be formed as smooth curved surfaces. Moreover, the number of first end surfaces and second end surfaces, the lengths in the circumferential direction or the lengths of the radial direction can be set up arbitrarily.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

The disclosure of Japanese Patent Application No. 2004-207598 filed on Jul. 14, 2004 including specification, drawings and claims is incorporated herein by reference in its entirety.

What is claimed is:

1. A valve body rotatably supported in an intake air passage of an engine, comprising:

an upstream side surface disposed upstream of an intake air flow in the intake air passage when the valve body is closed;

a downstream side surface disposed downstream of the intake air flow in the intake air passage when the valve body is closed;

an outer circumferential surface formed between the upstream side surface and the downstream side surface;

wherein the outer circumferential surface has a first end surface which is formed at a first angle with respect to the upstream side surface, and a second end surface which is formed at a second angle with respect to the upstream side surface; and wherein the first angle is different from the second angle.

2. A valve body rotatably supported in an intake air passage, comprising:

an at least one first end surface having a first end portion formed on the outer circumferential portion of the valve body that defines a first taking off position of an intake air; and an at least one second end surface having a second end portion formed on the outer circumferential portion of the valve body and positioned adjacent to the at least one first end portion which defines a second taking off position of the intake air, wherein the first and second taking off positions are shifted circumferentially relative to each other.

3. The valve body according to claim 2, wherein the second end portion is shifted from the first end portion in a downstream direction.

4. The valve body according to claim 2, further including a step surface is formed between the at least one first end surface and the at least one second end surface.

5. The valve body according to claim 4, wherein the step surface is curved.

6. A throttle valve of an engine comprising:
a valve body for controlling an amount of an intake air into the engine;
a rotational axis for rotatably supporting the valve body in an intake air passage;
wherein the valve body has at least one first end surface formed on an outer circumferential portion thereof and at least one second end surface formed on the outer circumferential portion the valve body wherein the first and second end surfaces are positioned adjacent to one another circumferentially to form a step surface, so that air eddies occurring from air flow passing over the first and second end surfaces are shifted relative to each other.

7. The throttle valve according to claim 6, wherein the valve body has at least one slot in the outer circumferential portion;
wherein the slot has a bottom surface which is the second end surface and a two step surfaces which are contact with the bottom surface and the first end surface.

8. The throttle valve according to claim 6, wherein the at least first end surface is formed on one of left and right half surfaces of the valve body, in which the left and right half surfaces are divided by an imaginary line passing transversely through an approximate center of a rotational axis of the valve body, and the second end surface is formed on the other left or right half surface, opposite the first end surface.

9. The throttle valve according to claim 6, wherein one of the at least one first end surface and the at least one second end surface are formed in a center portion of the valve body in the rotational axis extending direction and the other end surface is provided on both sides such that the end surface farmed in the center is sandwiched by the other end surface.

10. The throttle valve according to claim 6, wherein a plurality of the first and second end surfaces are formed at unequal intervals in a direction along the rotational axis.

11. The throttle valve according to claim 6, wherein the first and second end surfaces are radially formed from a center of the valve body.

12. The throttle valve according to claim 6, wherein the first and second end surfaces are formed in a streamline direction of the intake air.

13. The throttle valve according to claim 6, wherein the valve body has at least one step surface which is in contact with the at least one second end surface and the at least one first end surface.

14. The throttle valve according to claim 13, wherein the at least one step surface comprises a curved surface, and one of the at least one first end surfaces and at least one second end surfaces are connected to the step surface.

15. The throttle valve according to claim 6, wherein the lengths in a radial direction of the first end surfaces are different from adjoining the second end surfaces.

16. The throttle valve according to claim 15, wherein the lengths in a radial direction of the second end surfaces are different from one another.

17. The throttle valve according to claim 6, wherein a plurality of the first and second end surfaces are formed at equal intervals in a circumferential direction along the valve body.

18. The throttle valve according to claim 17, wherein the lengths in a circumferential direction of the first end surfaces are different from one another.

19. The throttle valve according to claim 18, wherein the lengths in a circumferential direction of the first end surfaces are different from adjoining second end surfaces.

20. The throttle valve according to claim 19, wherein the lengths in a circumferential direction of the second end surfaces are different from one another.

* * * * *